US006461722B1

(12) United States Patent
Kittel et al.

(10) Patent No.: US 6,461,722 B1
(45) **Date of Patent: *Oct. 8, 2002**

(54) THERMAL TRANSFER LAMINATE

(75) Inventors: Mark D. Kittel, Berea, OH (US); Richard L. Sandt, Brunswick, OH (US); Charles K. Herrmann, Cleveland Heights, OH (US); Mark Wisniewski, Mentor, OH (US)

(73) Assignee: Avery Dennnison Corporation, Pasadena, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 09/702,355

(22) Filed: Oct. 30, 2000

Related U.S. Application Data

(63) Continuation of application No. 09/167,087, filed on Oct. 6, 1998, now Pat. No. 6,228,486.

(51) Int. Cl.[7] ............................ B32B 27/14; B32B 3/00

(52) U.S. Cl. ....................... 428/195; 428/204; 428/207; 428/211; 428/913; 428/914

(58) Field of Search ................................ 428/354, 204, 428/195, 207, 343, 211, 355 R, 913, 914

(56) References Cited

U.S. PATENT DOCUMENTS 4,271,531 A 6/1981 Torii et al.
4,426,422 A 1/1984 Daniels
4,704,310 A 11/1987 Tighe et al.
4,721,531 A 1/1988 Wildeman et al. .......... 106/309
5,104,719 A 4/1992 Kamen et al.
5,284,681 A * 2/1994 Shinonaga et al. ......... 427/316
5,284,688 A 2/1994 Hiatt
5,587,214 A * 12/1996 Mitchell, Jr. ............... 428/40.1
5,595,810 A 1/1997 Beinert et al.
5,733,615 A 3/1998 Rackovan et al.
6,228,486 B1 * 5/2001 Kittel et al. ................ 428/354

OTHER PUBLICATIONS

Water Ink Technologies, Inc., Technical Datasheet, Date unknown, 4 pages.

SunChemical, Flexible Packaging, Aug. 1990, 1 page.

SunChemical, Suntex MP, Date unknown, 1 page.

Sun Chemical Corporation, Health and Safety Dept., CLA91598F–Multibond Black, Apr. 9, 1998, 11 pages.

Sun Chemical Corporation, Health and Safety Dept., CLB04275F–Prokote Primer, Apr. 9, 1998 11 pages.

(List continued on next page.)

*Primary Examiner*—Cynthia H. Kelly
*Assistant Examiner*—B. Shewareged
(74) *Attorney, Agent, or Firm*—Renner, Otto, Boisselle & Sklar, LLP

(57) ABSTRACT

This invention relates to a thermal transfer laminate, comprising: a facestock comprising a first layer having an upper surface and a lower surface, and a heat-activatable adhesive layer underlying the lower surface of said first layer; an adhesion-promoting layer overlying the upper surface of said first layer; an abrasion-resistant transparent coating layer overlying said adhesion-promoting layer; and another adhesive layer overlying said abrasion-resistant coating layer. In one embodiment, an ink or graphics layer overlies the upper surface of the first layer of the facestock and provides a pictorial design and/or print message. In one embodiment, the laminate is adhered to a carrier sheet. In one embodiment, the laminate is adhered to a substrate such as an automotive interior surface.

38 Claims, 2 Drawing Sheets

OTHER PUBLICATIONS

SunChemical, Prokote Primer, Date Unknown, 1 page.

SunCure, Clear Coating RCA01302R, date unknown, p. 1.

Hostaphan Polyester Film, Product Bulletin, 10/96, 4 pages.

Rad–Cure Corp., Rad–Cure UV1008, 1990, 7 pages.

Sun Chemical Corp., Health and Safety Dept., RCA01302R–UV Coating, Apr. 9, 1998, 8 pages.

Union Carbide Research Product Technical Bulletin; Date unknown, 1 page.

Chevron Chemical Co., Technical Data Sheet, Sep. 16, 1994, 1 page.

Ampacet Product Information, date unknown, 1 page.

Ampacet Product Information, Jul. 28, 1998, 1 page.

A. Schulman Inc., Polybatch F 20, Jan. 28, 1996.

A. Schulman Inc., Polybatch PF 92 D, Jan. 29, 1996.

A. Schulman Inc., Polybatch White P8555 SD, Mar. 5, 1996.

Material Safety Data Sheet, A.J. Daw Printing Ink Co., Inc., Apr. 14, 1997, 3 Pages.

Material Safety Data Sheet; A. J. Daw Printing InkCo., Inc., Apr. 14, 1997.

Adhesion and Bond, Encyclopedia of Polymer Science and Engineering vol. 1, pp. 476–546, Interscience Publishers, 2nd Ed. 1985.

PCT International Search Report for International Application No., PCT/US99/21351 mailed Dec. 16, 1999.

* cited by examiner

THERMAL TRANSFER LAMINATE

This application is a continuation of Ser. No. 09/167,087 filed Oct. 6, 1998 now U.S. Pat. No. 6,228,486.

TECHNICAL FIELD

This invention relates to thermal transfer laminates. These thermal transfer laminates are useful in providing pictorial and/or print designs or messages (e.g., labels, decals, etc.) adhered to substrates (e.g., metal, plastic, leather, paper or textile substrates) such as automotive interior surfaces (e.g., seat belts, visors, dashboards, headrests, seat-backs, door panels, and the like).

BACKGROUND OF THE INVENTION

Thermal transfer laminates are used in automotive interiors to provide instructional and/or warning labels on seat belts, visors, dashboards, and the like. A typical construction for these laminates is illustrated in FIG. 1. Referring to FIG. 1, thermal transfer laminate 10 has a paper carrier 12 and a release coating 14 adhered to one side of the paper carrier 12. Ink or graphics layer 16 is adhered to the release coating 14 and heat-activatable adhesive layer 18 is adhered to graphics layer 16. The laminate 10 is placed on substrate 20 (e.g., seat belt, visor, etc.) with the adhesive layer 18 in contact with the substrate 20. Heat and pressure are applied to the laminate 10 through the paper carrier 12 to heat seal the laminate 10 to the substrate 20. The paper carrier 12 is then removed from the heat-sealed laminate. The release coating 14 separate with the paper carrier 12. The ink or graphics layer 16 and adhesive layer 18 remain adhered to the substrate 20.

These thermal transfer laminates have a number of disadvantages. These include the fact that the ink or graphics layer 16 cannot be seen through the paper carrier 12 during the application of laminate 10 to the substrate 20. This can result in an imprecise placement of the ink or graphics layer 16 on the substrate 20. The ink or graphics layer 16 as applied to the substrate 20 tends to conform to the surface contours of the substrate 20 and when the surface is not smooth, (e.g., when the substrate 20 is a foam-backed polyester automotive interior material) the pictorial design and/or print message provided by the ink or graphics layer often appears to be fuzzy or out of focus. Once applied to the substrate 20, the ink or graphics layer 16 tends to have poor chemical resistance and durability (e.g., poor abrasion resistance) characteristics, and poor opacity. These problems are overcome by the inventive thermal transfer laminates.

SUMMARY OF THE INVENTION

This invention relates to a thermal transfer laminate, comprising: a facestock comprising a first layer having an upper surface and a lower surface, and a heat-activatable adhesive layer underlying the lower surface of said first layer; an adhesion-promoting layer overlying the upper surface of said first layer; an abrasion-resistant transparent coating layer overlying said adhesion-promoting layer; and another adhesive layer overlying said abrasion-resistant coating layer. In one embodiment, an ink or graphics layer is positioned between the adhesion-promoting layer and the abrasion-resistant transparent coating layer, and provides a pictorial and/or print design or message. In one embodiment, the laminate is adhered to a carrier sheet. In one embodiment, the laminate is adhered to a substrate such as an automotive interior surface.

BRIEF DESCRIPTION OF THE DRAWINGS

In the annexed drawings, like references indicate like parts or features.

DESCRIPTION OF THE PREFERRED EMBODIMENTS

Figure 1:
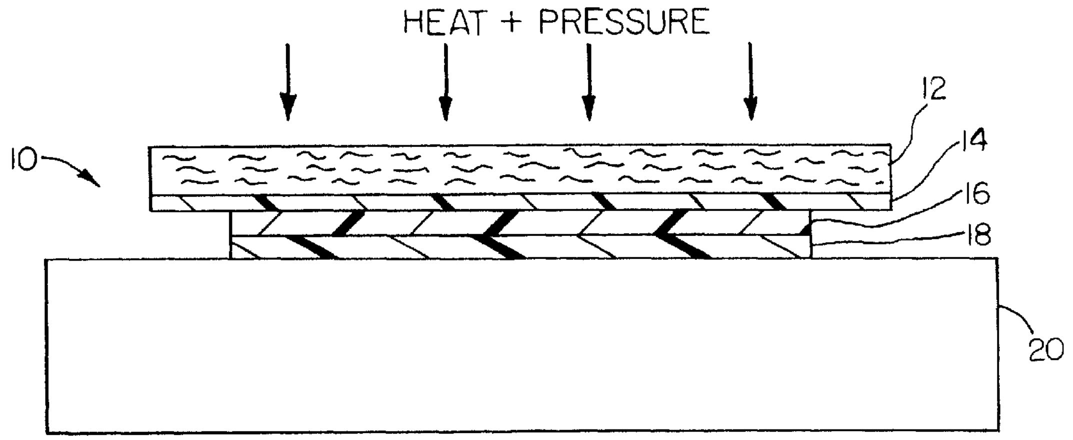
FIG. 1 PRIOR ART
FIG. 1 is a schematic illustration of the side of a prior art thermal transfer laminate, the laminate being heat sealed to a substrate.
Figure 2:
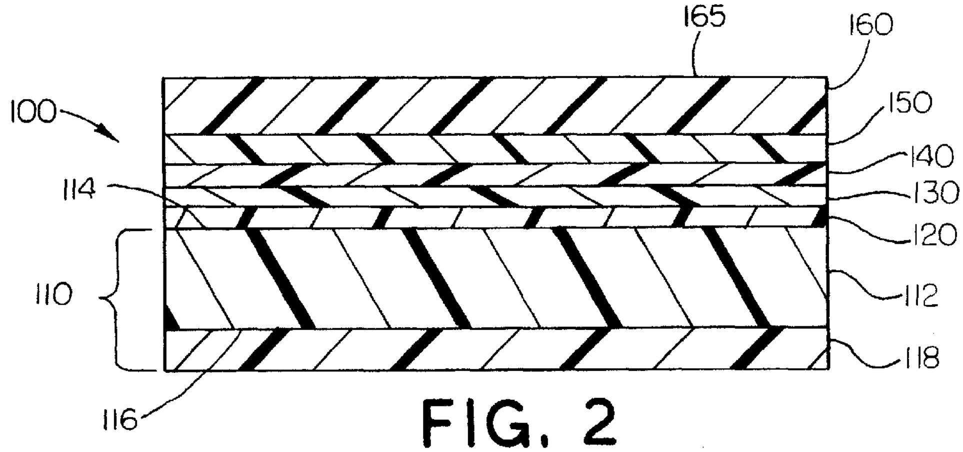
FIG. 2 is a schematic illustration of the side view of a thermal transfer laminate embodying the present invention in a particular form.

Referring to FIG. 2, the inventive thermal transfer laminate, in one of its illustrated embodiments, is generally indicated by the reference numeral 100, and is comprised of: a facestock 110 comprising a first layer 112 which has an upper surface 114 and a lower surface 116, and a heat-activatable adhesive layer 118 underlying surface 116; an ink or graphics layer 120 in the form of a mono-colored or multi-colored printed message, pictorial design, or combination thereof, overlying upper surface 114; an adhesion-promoting layer 130 overlying ink layer 120; an abrasion-resistant transparent coating layer 140 overlying the adhesion-promoting layer 10; another adhesive layer 150 overlying the abrasion-resistant coating layer 140; and a carrier sheet 160 adhered to the adhesive layer 150.

Figure 3:
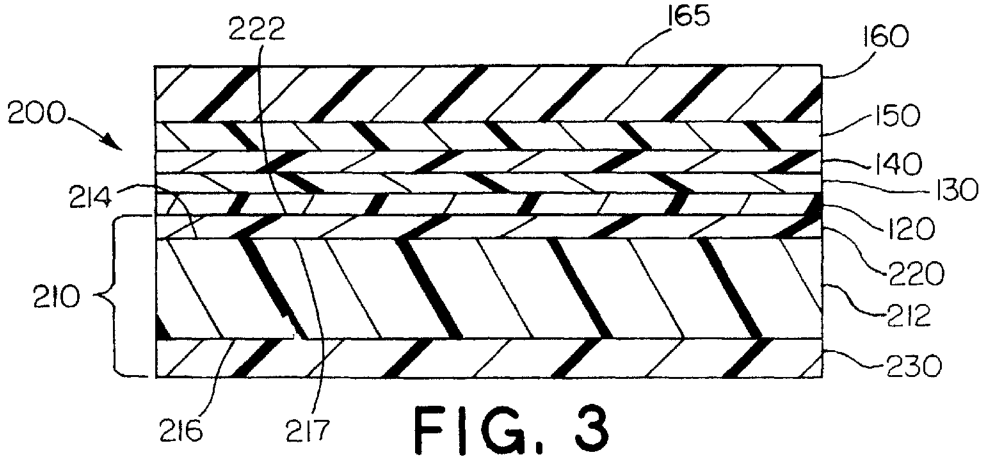
FIG. 3 is a schematic illustration of the side view of an alternative embodiment of the thermal transfer laminate of the present invention.

An alternate embodiment of the inventive thermal transfer laminate is illustrated in FIG. 3. In this alternate embodiment, thermal transfer laminate 200 is the same as the thermal transfer laminate 100 depicted in FIG. 2 except that thermal transfer laminate 200 uses a different facestock, namely, facestock 210. Facestock 210 is comprised of a thermoplastic core layer 212 having a upper surface 214 and a low surface 216. An upper thermoplastic film layer 220 is adhered to the upper surface 214 of core layer 212. The lower surface 217 of film layer 220 is in contact with the upper surface 214 of core layer 212. The upper surface 222 of film layer 220 is a printable surface. Heat-activatable adhesive layer 230 is adhered to the lower surface 216 of core layer 212. The remaining parts of thermal transfer laminate 200 are the same as the correspondingly numbered parts of thermal transfer laminate 100. That is, ink or graphics layer 120 overlies upper surface 222; adhesion-promoting layer 130 overlies ink layer 120; abrasion-resistant transparent coating layer 140 overlies adhesion-promoting layer 130; adhesive layer 150 overlies abrasion-resistant transparent coating layer 140; and carrier sheet 160 is adhered to adhesive layer 150.

Figure 4:
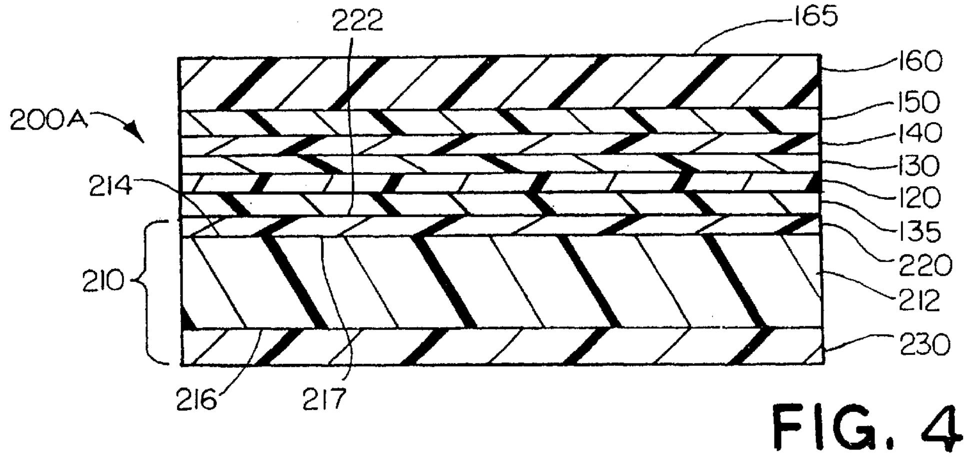
FIG. 4 is a schematic illustration of the side view of still another embodiment of the thermal transfer laminate of the present invention.

The thermal transfer laminate 200A depicted in FIG. 4 is identical to the thermal transfer laminate 200 depicted in FIG. 3, with the exception that the thermal transfer laminate 200A includes another adhesion-promoting layer 135 positioned between the upper surface 222 of film layer 220 and ink or graphics layer 120. In all other respects the thermal transfer laminates 200 and 200A are the same.

In one embodiment, the upper surface 114 of first layer 112 and the upper surface 222 of film layer 220 are corona treated to raise the surface energy of such surfaces to allow for enhanced printing on such surfaces. Corona treating involves discharging up to about 10,000 volts of electricity from a ceramic electrode to a ground roll over which the film is passing. This high voltage field called "corona" alters the surface of the film. Treating the surface of the film raises the surface energy of the film (measured in terms of dyne level) and allows for enhanced printing.

The facestocks 110 and 210 typically have overall thicknesses of about 1 to about 25 mils, and in one embodiment about 1 to about 20 mils, and in one embodiment about 1 to about 15 mils, and in one embodiment about 1 to about 10 mils, and in one embodiment about 2 to about 7 mils, and in one embodiment about 3 to about 5 mils. The thickness of heat-activatable adhesive layers 118 and 230 range from about 0.1 to about 10 mils, and in one embodiment about 0.1 to about 5 mils, and in one embodiment about 0.3 to about 2 mils.

The core layer 212 has a thickness of about 10% to about 90% of the facestock 210, and in one embodiment about 20% to about 80%, and in one embodiment about 30% to about 70% and in one embodiment about 40% to about 60%, with the combined thicknesses of the layers 220 and 230 making up the remainder of the thickness. The thicknesses of the layers 220 and 230 may be the same or different. In one embodiment, the thickness of the film layer 220/core layer 212/heat-activatable adhesive layer 230 is 10%/180%/10%, and in one embodiment 15%/70%/15%, and in one embodiment 20%/60%/20%. In one embodiment, the ratio is 10%/60%30%. In general, it is preferred for reasons of cost to use relatively thin heat-activatable adhesives layers. However, relatively thick layers are often required when the substrate to which the thermal transfer laminate is to be adhered is relatively rough or porous (e.g., a woven fabric substrate).

The first layer 112 and core layer 212 may be comprised of metal foil, polymer film, paper sheet, or combinations thereof. These layers may be comprised of textile including woven and non-woven fabrics made of natural or synthetic fibers. These layers may be single-layered sheets or films or they may be multi-layered constructions. These include polymeric films and multi-layered polymeric films. The multi-layered constructions and multilayered polymeric films have two or more layers, and in one embodiment about two to about seven layers, and in one embodiment about three to about five layers. The layers of such multi-layered constructions and films may have the same composition and/or size or they may be different.

The metal foils include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorus, chromium/molybdenum, nickel/chromium, nickel/phosphorous, and the like. The metal foils can be used by themselves or they can be joined or adhered to a polymeric sheet or film to form a multi-layered laminate or construction.

The polymer films include polyolefins (linear or branched), polyamides, polystyrenes, nylon, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of α-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.940 to about 0.965 g/cm$^3$. An example of a commercially available material that is useful is available from Du Pont under the trade designation Mylar LB; this material is identified as being a biaxially oriented polyester film. Films prepared from blends of copolymers or blends of copolymers with homopolymers also are useful. The films may be extruded as monolayered films or multi-layered films. The films may be oriented films or nonoriented films.

The paper sheets include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The layers 112 and 212 may be comprised of a polymer-coated paper which is basically a sheet of paper that is coated on either one or both sides with a polymer coating. The polymer coating, which may be comprised of a high, medium, or low density polyethylene, polypropylene, polyester, and other similar polymer films, is coated on the paper surface to add strength and/or dimensional stability. The weight of these types of coated paper facestocks can vary over a wide range with weights in the range of about 5 to about 50 lb/ream being useful. In total, the final coated paper facestock may be comprised of between about 10% and about 40% by weight polymer. For two-sided coatings, the quantity of polymer is usually approximately evenly divided between the top and bottom surface of the paper.

The heat-activatable adhesive layers 118 and 230 may be made from heat-activatable adhesive or thermoplastic film materials. These include polyolefins (linear or branched), polyamides such as nylon, polyester copolymers, ionomers based on sodium or zinc salts of ethylene methacrylic acid, polyacrylonitriles, and ethylene-vinyl acetate copolymers. Included In this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of α-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyolefins include amorphous polyolefins. The polyethylenes that are useful have various densities including low, medium and high density ranges as defined above. The ethylene/methyl acrylate copolymers available from Chevron under the tradename EMAC can be used. These include EMAC 2260, which has a methyl acrylate content of 24% by weight and a melt index of 2.0 grams/10 minutes @ 190° C., 2.16 Kg; and EMAC SP 2268T, which also has a methyl acrylate content of 24% by weight and a melt index of 10 grams/10 minutes @190° C., 2.16 Kg. Polymer film materials prepared from blends of copolymers or blends of copolymers with homopolymers are also useful.

The film layer 220 is comprised of thermoplastic film materials selected to provide ink-printable surfaces which provide good quality, stable print. Illustrative thermoplastics which may be used alone or in combination include polyolefins such as polyethylene, polypropylene and polybutylene, thermoplastic polyesters, polyamides such as nylon, acrylic copolymers such as polyethylene methacrylic acid, polyethylene ethyl acrylate and polyethylene methyl acrylate, polystyrene, polyurethane, polycarbonate, polyacrylonitriles, ethylene-propylene copolymers, etc. The choice of material for the film layer 220 is determined by the properties desired for this layer such as improved printability, weatherability, etc. The choice of the material for the film layer 220 is also dependent on the material used for the heat-activatable adhesive layer 230 if the layers 220 and 230 are to be wound up against each other. When the layers 220 and 230 are wound up against each other, blocking in the roll is a concern especially if the roll may be exposed to heat during storage or shipping.

In one embodiment, ethylene vinyl acetate copolymer (EVA) and polyolefin blends with EVA are useful materials for the film layer 220. For good printability, the EVA content of the blend should be above about 10% by weight, and in one embodiment between about 20% and about 80%, and in one embodiment from about 30% to about 70%. While the EVA content can be higher, the polyolefin is the less costly component. Also, higher EVA contents tend to make the films more prone to blocking problems. The vinyl acetate content of the EVA copolymers may range from about 5% to about 25%. UE 631-04, which is an ethylene vinyl acetate copolymer having a vinyl acetate content of 19% by weight and is available from Quantum Chemical, is an example of a commercially available copolymer that can be used.

The olefin polymer of the polyolefin-EVA blends may be polymers and copolymers of alpha-olefins such as ethylene, propylene. Examples of such polymers and copolymers include polyethylene, polypropylene, copolymers of ethylene and propylene, blends of polyethylene and/or polypropylene with ethylene-propylene copolymers, etc. A commercial example is WRD 51057, which is a product of Union Carbide identified as a polypropylene homopolymer.

The layers 112 and 212 may be clear in appearance or they may be pigmented. The pigments that can be used Include titanium dioxide, both rutile and anatase crystal structure. In one embodiment, the pigment is added to the core layer material in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 265° C. Examples include polyethylene, polypropylene, polybutylene, polyester, nylon and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename PolyBatch White P8555 SD, which is identified as a white color concentrate having a coated rutile titanium dioxide concentration of 50% by weight in a polypropylene homopolymer carrier resin. Another example is Ampacet 110233 which is a product of Ampacet Corporation identified as a $TiO_2$ concentrate containing 50% rutile $TiO_2$ and 50% low density polyethylene. The concentration of pigment in the core layers 112 and 212 can be up to about 25% by weight, and when used is generally in the range of about 5% to about 25% by weight, and in one embodiment about 10% to about 20% by weight.

The layers 112 and 212 may include a filler material to increase opacity. The fillers that can be used include calcium carbonate and talc. In one embodiment, the filler is added to the core layer material in the form of a concentrate containing the filler and a resin carrier. The concentrate may contain, for example, about 20% to about 80% by weight filler, and about 20% to about 80% by weight resin carrier. The resin carrier can be any thermoplastic polymer having a melting point in the range of about 100° C. to about 265° C. Examples include polyethylene, polypropylene, polybutylene, polyester, nylon, and the like. Also included are thermoplastic copolymers such as ethylene methylacrylate, and the like. In one embodiment, a calcium carbonate concentrate is used which is comprised of a blend of about 50% to about 80% by weight polypropylene and about 20% to about 50% by weight calcium carbonate. An example of a commercially available pigment concentrate that can be used is available from A. Schulman Inc. under the tradename PF 920, which is identified as a calcium carbonate concentrate having a calcium carbonate concentration of 40% by weight in a polypropylene homopolymer carrier resin. Another example is Ampacet 101087 which is a product of Ampacet Corporation identified as a calcium carbonate concentrate containing 30% by weight calcium carbonate and 70% by weight ethylene methylacrylate. The concentration of filler in the layers 112 and 212 can be up to about 40% by weight, and when used is generally in the range of about 10% to about 40% by weigh, and in one embodiment about 10% to about 35% by weight.

The layers 112, 118, 212, 220 and 230 may contain ultraviolet (UV) light absorbers or other light stabilizers. These additives are included to prevent degradation due to sunlight. One useful type of stabilizer is a hindered amine light stabilizer. Hindered amine light stabilizers are described in the literature such as in U.S. Pat. No. 4,721,531, columns 4 to 9, which are incorporated herein by reference. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemassorb", and from Cytec under the general designation "Cyasorb-UV." Examples include Tinuvin 111 which is identified as a mixture of 1,3,5-Triazine-2,4,6-triamine, N,N'''-[1,2-ethanediylbis[[[4,6-bis[butyl(1,2,2,6,6-pentamethyl-4-piperidinyl)amino]-1,3,5-triazin-2-yl]imino]-3, 1propanediyl]]-bis[N',N''-dibutyl-N',N''-bis(1,2,2,6,6-pentamethyl-4-piperidinyl)- and dimethyl succinate polymer with 4-hydroxy-2,2,6,6,-tetramethyl-1-piperidineethanol; Tinuvin 123 which is identified as bis-(1-octyloxy-2,2,6,6-tetramethyl-4-piperidinyl)sebacate;

Tinuvin 770 which is identified as bis-(2,2,6,6-tetramethyl-4-piperidinyl)-sebacate; Tinuvin 765 which is identified as bis-(1,2,2,6,6-pentamethyl-4-piperidinyl)-sebacate; Tinuvin 622 which is a dimethyl succinate polymer with 4-hydroxy-2,2,6,6,-tetramethyl-1-piperidineethanol; and Chemassorb 944 which is poly[[6-(1,1,3,3-tetramethylbutyl)amino]-1,3,5-triazine-2,4-diyl][[2,2,6,6-tetramethyl-4-piperidyl) imino]]hexamethylene(2,2,6,6-tetramethyl-4-piperidyl) imino]], and Chemassorb 119 which is identified as being 1,3,5-Triazine-2,4,6-triamine-N',N"-[1,2-ethanediylbis[[[4,6-bis[butyl(1,2,2,6,6-pentamethyl-4-peperidinyl)amino]-1,3,5-triazin-2-yl]imino]-3,1propanediyl]]-bis[N',N"-dibutyl-N',N"-bis(1,2,2,6,6-pentamethyl-4piperidinyl)-. UV light absorbers include those available from Ciba-Geigy under the Tinuvin name and Great Lakes Chemical Corporation under the trade designation "Lowilite." Examples include: Tinuvin P, which is identified as 2-(2'-hydroxy-5'-methylphenyl)-benzotriazole; Tinuvin 326, which is identified as 2-(3'-tert-butyl-2'-hydroxy-5'methylphenyl)-5-chlorobenzotriazole; Tinuvin 238, which is identified as 2-(2'hydroxy-3',5'-di-tert-amylphenyl)benzotriaz Lowilite 20, which is identified as 2-hydroxy-4-methoxy-benzophenone; Lowilite 22, which is identified as 2-hydroxy-4-n-octoxy-benzophenone; and Lowilite 1200, which is identified as 2-hydroxy-4-n-dodecyloxy-benzophenone. A useful stabilizer is available under the tradename Ampacet 10561 which is a product of Ampacet identified as a UV stabilizer concentrate containing 20% by weight of a UV stabilizer and 80% by weight of a low density polyethylene carrier resin. The concentration of UV absorber or light stabilizer can be up to about 2.5% by weight, and in one embodiment is about 0.05% to about 1% by weight.

The heat-activatable adhesive layer 118 generally has a lower melting point than any of the other layers used in the thermal transfer laminate 100 to permit the layer 118 to function as heat-activatable adhesives. Similarly, the heat-activatable adhesive layer 230 generally has a lower melting point than any of the other film layers used in the thermal transfer laminate 200 or 200A. Typically, the melting points as determined by differential scanning colorimetry at second heat cycle of the heat-activatable adhesive layers 118 and 230 are in the range of about 50° C. to about 150° C., and in one embodiment about 70° C. to about 85° C. The melting point of the heat-activatable adhesive layer 118 is typically at least about 10° C. lower than the melting point of the core layer 112, and in one embodiment it is about 86° C. lower. The melting point of the heat-activatable adhesive layer 230 is typically at least about 10° C. lower than the melting point of the core layer 212, and in one embodiment it is about 86° C. lower. In embodiments wherein the thermal transfer laminate is to be bonded to a rough or porous substrate (e.g., a woven fabric) it is preferred that the heat-activatable adhesive layer 118 or 230 be relatively thick and that the difference between the melting point of the core layer 112 or 212 and the melting point of the corresponding heat-activatable adhesive layer 118 or 230 be as high as possible. This provides the inventive thermal transfer laminate with the advantage of preventing or reducing the rough or porous surface of the substrate from showing through the laminate to provide a clear and precise pictorial design and/or print message rather than a fuzzy or out-of-focus looking image.

The layers 112, 118, 212, 220 and/or 230 may contain a slip additive. These include primary amides such as stearamide, behenamide, oleamide, erucamide, and the like; secondary amides such as stearyl erucamide, erucyl erucamide, oleyl palmitamide, stearyl stearamide, erucyl stearamide, and the like; ethylene bisamides such as N,N'-ethylenebisstearamide, N,N'-ethylenebisolemide and the like; and combinations of any two or more of the foregoing amides. An example of a useful slip additive is available from Ampacet under the trade designation 10061; this product is identified as a concentrate containing 6% by weight of a stearamide slip additive. The slip additive can be used at a concentration in the range of up to about 4% by weight, and in one embodiment about 0.05% to about 2% by weight, and in one embodiment about 0.1% to about 0.5% by weight.

The layers 112, 118, 212, 220 and/or 230 may contain an antiblock additive. These include natural silica, diatomaceous earth, synthetic silica, glass spheres, ceramic particles, calcium carbonate particles, calcium silicate particles, fatty amide particles, aluminum silicate, and the like. Examples of commercially available antiblock additives include those available from A. Schulman under the trade designation CABL 4040 which is identified as solid pellets containing 5% silicate, 5% ceramic microspheres and the remainder being a low density polyethylene. Schulman AB5, which is an antiblock concentrate available from A. Schulman which comprises 5% solid synthetic amorphous silica in 95% low density polyethylene, can also be used. Polybatch F-20, which is available from A. Schulman and is identified as concentrate containing 20% natural silica based in low density polyethylene, can be used. Other useful additives include those available from Zeelan Industries under the trade designation Zeeospheres; 3M under the trade designation Scotchlite Glass Bubbles; Potters Industries under the trade designation Spheriglass; Mo-Sci Corporation under the trade designation Precision Glass Spheres (Class IV); Huber under the trade designation Huber Q; Nyco Minerals under the trade designations Nycor, Nyad, Ultrafibe, Primglos, Nyglos and Wallastocoat; Jayco under the trade designation Dragonite; Witco under the trade designation Kenamide; and U.S. Silica under the trade designation Min-U-Sil. The antiblock additive may be used at a concentration of up to about 20% by weight, and in one embodiment about 0.1% to about 10% by weight, and in one embodiment about 0.5% to about 5% by weight.

The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The amount of antiblock and slip additives may be the same or different in each layer. Generally it is desireable to minimize the amount of these additives to avoid ink adhesion and low heat seal bond problems. However, a sufficient amount to prevent blocking of self wound rolls of film is usually desirable.

The layers 112, 118, 212, 220 and/or 230, may contain a minor amount of an adhesive material to enhance the adhesion of the layers 112 and 118 to each other, or the layers 220 and/or 230 to the core layer 212. Also, or alternatively, tie layers of an adhesive resin can be positioned between the film layers 112 and 118, or between the core layer 212 and either or both of the film layers 220 and 230 for enhancing adhesion. The adhesive material may be comprised of an adhesive resin such as ethylene/vinyl acetate copolymer. These include DuPont Elvax 3170 and 319OLG. The adhesive resins available from DuPont under the tradename Bynel can also be used. When included in the core layer 212, the adhesive resin is used at a concentration of up to about 40% by weight, and in one embodiment about 5% to about 25% by weight. When used in the layers 112, 118, 220 and/or 230, the adhesive material is used at a concentration of up to about 100% by weight, and in one embodiment about 45% to about 85% by weight. When used in the form of a film layer or layers between the film layers 112 and 118, or between the core layer 212 and the film layers 220 and 230, each of such adhesive resin film layer or layers has a thickness of about 5% to about 40% of the thickness of the overall facestock 110 or 210, and in one embodiment about 10% to about 25%.

The facestocks 110 and 210 may be made using a polymeric coextrusion process. The coextrudate of polymeric film materials is formed by simultaneous extrusion from two or more extruders and a suitable known type of coextrusion die whereby the layers 112 and 118, or core layer 212 and the film layers 220 and 230 are adhered to each other in a permanently combined state to provide a unitary coextrudate. As indicated above, a tie layer or layers of an adhesive resin can be included in the facestocks 110 and 210 and such tie layer or layers can be coextruded with the facestocks 110 and 210. Alternatively, an extrusion coating process may be used to lay down one or more of the layers onto a moving web. The processes for making these facestocks are well known in the art.

The ink or graphics layer 120 is a mono-colored or multi-colored ink layer, depending on the printed message and/or pictorial design intended for the thermal transfer laminate. These include variable imprinted data such as serial numbers, bar codes, and the like. The thickness of the ink layer is typically in the range of about 0.5 to about 5 microns, and in one embodiment about 1 to about 4 microns, and in one embodiment about 3 microns. The inks used in the ink layer 120 are preferably commercially available water-based, solvent-based or radiation-curable, especially UV curable, inks appropriately chosen for the particular construction of the thermal transfer laminate and/or the particular printing method used. Examples include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

The adhesion-promoting layers 130 and 135 may be made from any radiation-curable, solvent-based or water-based primer designed to increase the adhesion of coatings to a film substrate. The layer 130 is transparent and the layer 135 is preferably transparent. The adhesion promoting layer material is typically comprised of a lacquer and a diluent. The lacquer is typically comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include ethanol, isopropanol, butanol, ethyl acetate, propyl acetate, butyl acetate, toluene, xylene, acetone, methyl ethyl ketone, heptane, and mixtures thereof. The ratio of lacquer to diluent is dependent on the viscosity required for application of the adhesion-promoting layer, the selection of such viscosity being within the skill of the art. Examples of the adhesion-promoting layer materials that can be used include CLB04275F—Prokote Primer (a product of Sun Chemical Corporation identified as a solvent based primer useful with inks and coatings). The adhesion-promoting layers 130 and 135 typically have thicknesses in the range of about 1 to about 4 microns, and in one embodiment about 2 microns.

The abrasion-resistant transparent coating layer 140 may be made from any solvent-based, water-based or radiation-curable coating material designed to provide abrasion resistance and optionally enhanced gloss. Coating layer 140 is transparent. This coating layer is made from UV curable oligomers such as epoxies, urethanes, polyesters, acrylics, and the like. These are cured by free-radicals generated by photoinitiators after exposure to UV light. Reactive diluents such as hexanediol diacrylate, pentaerythritol, tetraacrylate, N-vinylpyrrolidinone, and the like, can be used to control viscosity of the coating before cure and to modify the crosslink density. Epoxy resins and alkyl vinyl ethers, which are cationically cured, can also be used. Reactive diluents such as vinyl ethers, limonene dioxide, glycidyl ether, and the like, can be used. The coating may also containing wetting agents, levelling agents, waxes, slip aids, and light stabilizers. A commercially available coating material that can be used is RCA01302R-UV Coating (a product of Sun Chemical identified as a coating material for inks). This coating layer typically has a thickness of about 1 to about 4 microns, and in one embodiment about 2 microns.

The adhesive layer 150 may be comprised of any removable pressure-sensitive adhesive material, or radiation-curable, especially UV curable, adhesive material suitable for coating a film substrate. When the adhesive layer 150 is a radiation-curable adhesive layer it is transparent. When the adhesive layer 150 is a removable pressure sensitive adhesive layer, it is preferably (but not necessarily) transparent. The radiation-curable adhesive materials may be made from compositions containing multifunctional acrylate monomers and oligomers. Acrylated urethanes and acrylated acrylics are useful. The radiation-curable adhesives may include photoinitiators and optionally surfactants to provide a uniform flow resulting in an even coating. An example of a commercially available adhesive material that can be used is Rad-Cure UV 1008 (a product of Rad-Cure Corporation identified as a UV-curable, solvent-free adhesive containing 70–95% by weight multifunctional acrylate monomers and oligomers, 5–20% by weight photoinitiator and 0–5% by weight surfactants).

The removable pressure-sensitive adhesive can be any removable pressure sensitive adhesive known in the art for use with film substrates. The term "removable" is used herein to refer to an adhesive that can stick to layer 140 and carrier sheet 160 without edge lifting and can be removed without damaging either layer 140 or sheet 160. The removable adhesive layer 150 is preferentially adherent to carrier sheet 160 and thus separates from layer 140 with carrier sheet 160. The removable pressure-sensitive adhesives that can be used are known in the art and include rubber based adhesives, acrylic adhesives, vinyl ether adhesives, silicone adhesives, and mixtures of two or more thereof. The adhesives may be hot melt, solvent-based or water based adhesives. Included are the pressure sensitive materials described in "Adhesion and Bond", *Encyclopedia of Polymer Science and Engineering,* Vol. 1, pages 476–546, Interscience Publishers, 2$^{nd}$ Ed. 1985, the disclosure of which is hereby incorporated by reference. The pressure sensitive adhesive materials that are useful may contain as a major constituent an adhesive polymer such as acrylic-type polymers; block copolymers; natural, reclaimed, or styrene-butadiene rubbers; tackified natural or synthetic rubbers; or random copolymers of ethylene and vinyl acetate, ethylene-vinyl-acrylic terpolymers, polyisobutylene, poly(vinyl ether), etc. Other materials may be included in the pressure sensitive adhesive such as tackifying resins, plasticizers, antioxidants, fillers, pigments, waxes, etc.

The adhesive layer 150 has a thickness that is typically in the range of about 0.5 to about 5 microns, and in one embodiment about 1 to about 4 microns, and in one embodiment about 1.5 to about 2 microns.

Each of the layers 120, 130, 140 and 150 is applied and cured using known techniques. The application techniques include gravure, reverse gravure, offset gravure, roller coating, brushing, knife-over roll, metering rod, reverse roll coating, doctor knife, dipping, die coating, spraying, curtain coating, flexographic, letter press, rotary screen, flat screen, and the like. The applied coating layers can be cured by exposure to heat or to known forms of ionizing or actinic non-ionizing radiation. Curing temperatures that can be used are in the range of about 40° C. to about 260° C., and in one embodiment about 40° C. to about 175° C., and in one embodiment about 40° C. to about 100° C., and in one embodiment about 40° C. to about 60° C. Useful types of radiation include ultraviolet light, electron beam, x-ray, gamma-ray, beta-ray, etc. Ultraviolet light is especially useful. The equipment for generating these forms of thermal cure or radiation cure are well known to those skilled in the art.

The carrier sheet 160 is placed in contact with the adhesive layer 150 using known techniques. When the adhesive 150 is a radiation-curable adhesive, the carrier sheet 160 is placed in contact with the adhesive prior to the curing of adhesive layer 150. The adhesive layer is then cured. When the adhesive is pressure-sensitive adhesive, it may be initially applied to the carrier sheet 160, and then the carrier sheet with applied adhesive is adhered to the coating layer 140. Alternatively, the pressure-sensitive adhesive may be applied to the coating layer 140, and then the carrier sheet is placed in contact with the adhesive to adhere the carrier sheet to the coating layer 140. The carrier sheet 160 can be comprised of paper, polymer film, or a combination thereof. Any of the paper or polymer films, or combinations thereof, discussed above as being useful as the layers 112 or 212 may be used as the carrier sheet 160. It is preferred, however, that the carrier sheet 160 be transparent to permit visibility of the ink or graphics layer 120 through the carrier sheet 160 (as well as through the other layers between the carrier sheet 160 and the ink or graphics layer 120). Thus, the use of transparent polymer films as the carrier sheet 160 is preferred. The outer surface 165 of the carrier sheet 160 may have a release coating adhered to it to facilitate rolling and unrolling of the thermal transfer laminates. Any release coating known in the art can be used. Silicone release coatings are especially useful. A commercially available polyester film that is useful as the carrier sheet 160 is Douglas Hanson E19506 (a product of Douglas Hanson identified as a clear polyester film having a release coating layer adhered to one side). Untreated polyester film can be used. The carrier sheet 160 typically has a thickness of about 0.25 to about 10 mils, and in one embodiment about 0.5 to about 5 mils, and in one embodiment about 2 mils. In one embodiment, the carrier sheet is a polyester film having a thickness of about 0.25 to about 10 mils. In one embodiment, the carrier sheet is a polyolefin film having a thickness of about 0.5 to about 5 mils. In one embodiment, the carrier sheet is a paper sheet having a thickness of about 1 to about 10 mils.

Figure 5:
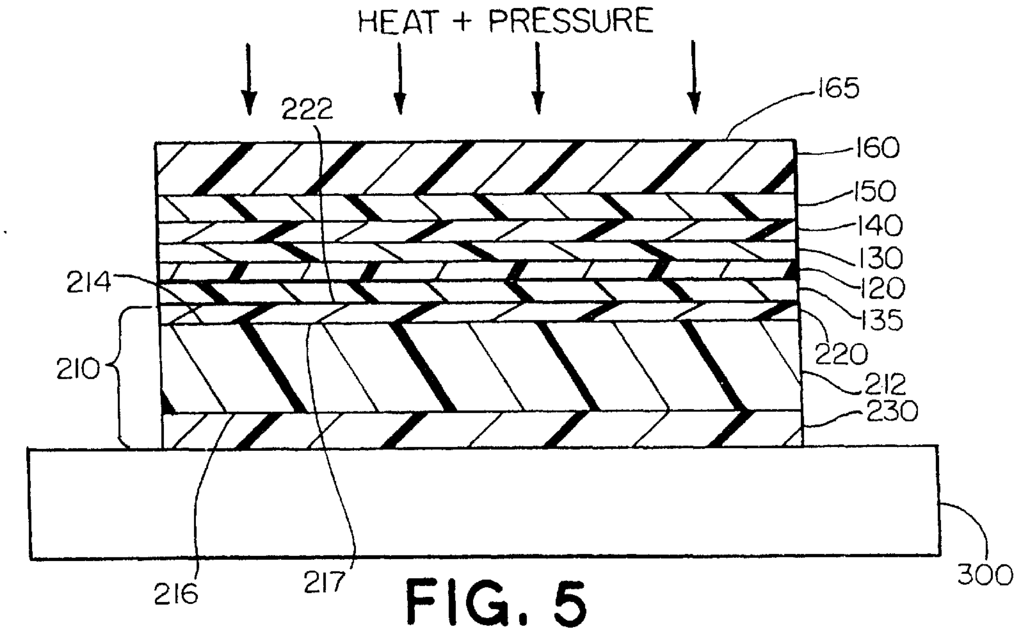
FIG. 5 is a schematic illustration showing the thermal transfer laminate of FIG. 4 being adhered to a substrate.

The thermal transfer laminates 100, 200 and 200A may be adhered to any substrate using heat-sealing techniques known in the art. Referring to FIG. 5, the thermal transfer laminate 200A is placed on substrate 300 with the heat-activatable adhesive layer 230 in contact with the substrate. Heat and pressure are applied to the thermal transfer laminate by a heated platen in contact with the carrier sheet 160. The heat passes through the thermal transfer laminate 200A and softens or melts the heat-activatable adhesive layer 230. The heat and pressure are removed, and the heat-activatable adhesive layer 230 cools and solidifies resulting in the formation of a heat-sealed bond between the thermal transfer laminate 200A and the substrate 300. Thermal transfer laminates 100 and 200 may be adhered to substrate 300 in a similar manner, the heat and pressure causing heat-activatable adhesive layer 118 or 230 to soften or melt, and the subsequent cooling of heat-activated adhesive layers 118 or 230 resulting in a heat-sealed bond between thermal transfer laminate 100 or 200 and substrate 300. The heat and pressure that are applied are sufficient to soften or melt the heat-activatable adhesive layers 118 or 230. Temperatures in the range of about 100° C. to about 300° C., and in one embodiment about 150° C. to about 250° C., and in one embodiment about 180° C. to about 210° C., are typically used. Pressures in the range of about 2 to about 20 psi, and in one embodiment about 8 to about 12 psi, are typically used. Dwell times of about 0.5 to about 60 seconds, and in one embodiment about 0.5 to 20 seconds, and in one embodiment about 0.5 to about 10 seconds may be used. Any heat-sealing press used for heat-sealing labels tapes, decals, and the like, to substrates can be used. These are well known in the art.

Figure 6:
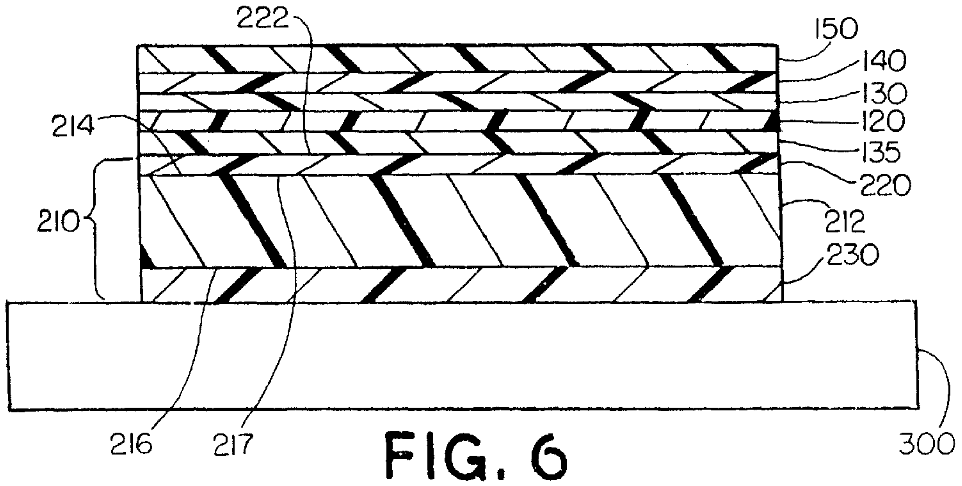
FIG. 6 is a schematic illustration showing the thermal transfer laminate of FIG. 4 adhered to a substrate, the carrier sheet of the laminate being removed.

The substrate 300 may be any substrate material suitable for receiving a thermal transfer laminate. The substrate 300 may be made of metal, plastic, leather, paper, and the like. The substrate 300 may be made of a textile material such as a woven or non-woven fabric made of natural or synthetic materials. The substrate may comprise an automotive interior surface such as the surface of a seat belt, visor, dashboard, headrest, seat-back, door panel etc. Upon application of the thermal transfer laminate to the substrate 300, the carrier sheet 160 is removed using known removal or stripping techniques. When the adhesive layer 150 is a removable pressure-sensitive adhesive, it is removed using known techniques. When the adhesive layer 150 is a radiation-cured adhesive layer, it remains adhered to coating layer 140 and functions as an additional protective layer. This is illustrated in FIG. 6.

EXAMPLE 1

Part A

A thermal transfer laminate is prepared Lising a coextruded polymeric film as the facestock. The facestock has a thermoplastic core layer, an upper thermoplastic film layer having an ink-printable surface adhered to one side of the core layer, and a heat-activable thermoplastic adhesive film layer adhered to the other side. The thickness of the facestock is 3.5 mils. The ratio of the thicknesses of the upper thermoplastic film layer to the core layer to the heat-activable thermoplastic adhesive film layer is 10:60:30. The core layer has the following composition (all percentages being by weight):

| | |
|---|---|
| A. Schulman Polybatch PF92D | 35% |
| A. Schulman Polybatch White P8555 SD | 35% |
| Union Carbide WRD5-1057 | 23% |
| Ampacet 10561 | 5% |
| Ampacet 10061 | 2% |

The upper thermoplastic film layer has the following composition:

| | |
|---|---|
| Union Carbide WRD5-1057 | 47% |
| UE631-04 | 46% |
| A. Schulman F-20 | 2% |
| Ampacet 10561 | 5% |

The heat-activatable thermoplastic adhesive film layer has the following composition:

| | |
|---|---|
| Chevron EMAC SP 2268T | 83% |
| A. Schulman F20 | 10% |
| Ampacet 10561 | 5% |
| Ampacet 10061 | 2% |

The upper thermoplastic film layer is corona treated. An adhesion promoting layer is then applied over the upper thermoplastic film layer using an anilox roll. The adhesion promoting material is CLB0-4275F—Prokote Primer. The adhesion promoting material is cured in an oven at a temperature of 40–50° C. This adhesion promoting layer has a thickness of 2 microns.

A multi-colored ink layer providing a pictorial design in combination with a printed message is applied over the above-mentioned adhesion promoting layer. The ink layer is applied using a sequence of three anilox rolls. The following inks are used:

Roll 1: Yellow 116 ink (a UV curable ink provided by Daw Ink)

Roll 2: Red 186 mink (a UV curable ink provided by Daw Ink)

Roll 3: Black ink (a UV curable black ink provided by Werneke Ink)

Each ink application is UV cured prior to the application of the next ink application. The ink layer has a thickness of 3 microns.

Another adhesion promoting layer is applied over the ink layer using an anilox roll. The adhesion promoting material is CLB04275F—Prokote Primer. This adhesion promoting layer has a thickness of 2 microns and is cured in an oven at a temperature of 40–50° C.

An abrasion-resistant transparent coating layer is applied over the adhesion promoting layer using an anilox roll. The abrasion-resistant coating layer material is RCA01302R-UV Coating. The abrasion-resistant layer has a thickness of 2 microns and is UV cured.

An adhesive layer is applied over the abrasion-resistant coating layer using an anilox roll. The adhesive layer material is Rad-Cure UV 1008. The adhesive layer has a thickness of 2 microns.

A polyester film carrier sheet having a thickness of 2 mils is adhered to the adhesive layer. The adhesive layer is then UV cured to complete the fabrication of the desired thermal transfer laminate. The polyester film that is used is provided by Douglas Hanson under the trade designation E 19506. This is a polyester film having a release coating layer on one of its sides. The side of the polyester film opposite the release coating layer is in contact with the UV-cured adhesive layer.

Each ink application as well as the abrasion-resistant transparent coating layer, and UV cured adhesive layer are cured using a medium pressure mercury do bulb, an arc length of 45 cm, 500 watts per inch, a dichromatic reflector and a line speed of 65 feet per minute. The ink applications and transparent coating layer are cured using 50% power. The adhesive layer is cured using 100% power.

Part B

The thermal transfer laminate from Part A is placed on a substrate. The substrate is foam-backed polyester upholstery material used for automotive interiors. The heat-activatable thermoplastic adhesive film layer is in contact with the substrate. The resulting composite is placed in a heated press. Heat and pressure are applied to the composite by a heated platen in contact with the polyester film carrier sheet. The temperature is 196° C. and the pressure is 9.1 psi. The dwell time is 2.5 seconds. The heat and pressure are sufficient to soften or melt the heat-activatable thermoplastic adhesive film layer. Upon cooling, the heat-activatable thermoplastic adhesive film layer forms a bond adhering the thermal transfer laminate to the substrate. The composite is removed from the press with the result being the thermal transfer laminate being heat-sealed to the substrate. The polyester film carrier sheet is removed leaving the remainder of the thermal transfer laminate adhered to the substrate. The multi-colored pictorial design formed with the ink layer is visible.

The inventive thermal transfer laminates have a number of advantages over the prior art. These include the fact that in embodiments wherein the carrier sheet 160 is transparent, the ink or graphics layer can be seen during application of the laminate to a substrate. This feature allows for precise placement of the ink or graphics layer on the substrate. Because of the presence of the facestock, the ink or graphics layer as applied to the substrate does not conform to minor surface contours or imperfections in the substrate. Thus, the pictorial design and/or print message provided by the ink or graphics layer is clear and precise, and has good opacity characteristics. Once applied to the substrate, the ink or graphics layer of the inventive laminate is protected and thus it has good chemical resistance characteristics and it is durable.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composite comprising a substrate and a thermal transfer laminate adhered to said substrate, said thermal transfer laminate comprising:

a facestock comprising a first layer having an upper surface and a lower surface, and a heat-activated adhesive layer underlying said lower surface of said first layer, said facestock being adhered to said substrate by said heat-activated adhesive layer;

an adhesion-promoting layer overlying said upper surface of said first layer; and an ink or graphics layer overlying said adhesion promoting layer; and an abrasion-resistant transparent coating layer overlying said ink or graphics layer.

2. The composite of claim 1 wherein said upper surface of said first layer is corona treated.

3. The composite of claim 1 wherein said first layer comprises a single-layered construction.

4. The composite of claim 1 wherein said first layer comprises a multi-layered construction.

5. The composite of claim 1 wherein said first layer comprises foil, paper, polymer film, textile, or a combination thereof.

6. The composite of claim 1 wherein said first layer is comprised of a polymeric film.

7. The composite of claim 1 wherein said first layer is comprised of a multi-layered polymeric film.

8. The composite of claim 1 wherein said facestock is comprised of a coextrudate.

9. The composite of claim 1 wherein said first layer is a thermoplastic core layer having an upper surface and a lower surface, and said heat-activatable adhesive layer is a thermoplastic film layer underlying said lower surface of said core layer, said facestock further comprising an upper thermoplastic core layer overlying said upper surface of said core layer.

10. The composite of claim 9 wherein said upper thermoplastic film layer is corona treated.

11. The composite of claim 9 wherein said upper thermoplastic film layer is comprised of a thermoplastic polymeric material selected from the group consisting of polyolefins, polyesters, polyamides, acrylic polymers, polystyrenes, polyurethanes, polycarbonates, polyacrylonitriles, ethylene-propylene copolymers, and mixtures of two or more thereof.

12. The composite of claim 1 wherein said heat-activatable adhesive layer is comprised of a heat-activatable adhesive or thermoplastic film material selected from the group consisting of polyolefins, polyamides, polyester copolymers, ionomers based on sodium or zinc salts of ethylene methacrylic acid, polyacrylonitriles, ethylene-vinyl acetate copolymers, ethylene methacrylic acid, ethylene methyl acrylate, ethylene acrylic acid, ethylene ethyl acrylate, and mixtures of two or more thereof.

13. The composite of claim 9 wherein said first layer is comprised of a thermoplastic polymeric material selected from the group consisting of polyolefins, polyamides, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, ethylene-vinyl acetate copolymers, and mixtures of two or more thereof.

14. The composite of claim 1 wherein said adhesion-promoting layer is comprised of a material selected from the group consisting of polyolefins, polyamides, polyesters, polyester copolymers, polyurethanes, polysulfones, polyvinylidene chloride, styrene-maleic anhydride copolymers, styrene-acrylonitrile copolymers, ionomers based on sodium or zinc salts of ethylene methacrylic acid, polymethyl methacrylates, acrylic polymers and copolymers, polycarbonates, polyacrylonitriles, ethylene-vinyl acetate copolymers, and mixtures of two or more thereof.

15. The composite of claim 1 wherein said abrasion-resistant transparent coating layer is made from UV curable oligomers selected from the group consisting of epoxies, urethanes, polyesters and acrylics.

16. The composite of claim 1 wherein said substrate is comprised of a metal, plastic, leather, paper or textile material, or combination of two or more thereof.

17. A thermal transfer laminate comprising:

a facestock comprising a first layer having an upper surface and a lower surface, and a heat-activatable adhesive layer underlying said lower surface of said first layer;

an adhesion-promoting layer overlying said upper surface of said first layer;

an ink or graphics layer overlying said adhesion promoting layer; and an abrasion-resistant transparent coating layer overlying said ink or graphics layer.

18. The laminate of claim 17 wherein another adhesive layer overlies said abrasion-resistant transparent coating layer.

19. The laminate of claim 18 wherein a carrier sheet is adhered to said another adhesive layer.

20. The laminate of claim 17 wherein said upper surface of said first layer is corona treated.

21. The laminate of claim 17 wherein said first layer comprises a single-layered construction.

22. The laminate of claim 17 wherein said first layer comprises a multi-layered construction.

23. The laminate of claim 17 wherein said first layer comprises foil, paper, polymer film, textile, or a combination thereof.

24. The laminate of claim 17 wherein said first layer is comprised of a polymeric film.

25. The laminate of claim 17 wherein said first layer is comprised of a multi-layered polymeric film.

26. The laminate of claim 17 wherein said facestock is comprised of a coextrudate.

27. The laminate of claim 17 wherein said first layer is a thermoplastic core layer having an upper surface and a lower surface, and said heat-activatable adhesive layer is a thermoplastic film layer underlying said lower surface of said core layer, said facestock further comprising an upper thermoplastic core layer overlying said upper surface of said core layer.

28. The laminate of claim 27 wherein said upper thermoplastic film layer is corona treated.

29. The laminate of claim 27 wherein said upper thermoplastic film layer is comprised of a thermoplastic polymeric material selected from the group consisting of polyolefins, polyesters, polyamides, acrylic polymers, polystyrenes, polyurethanes, polycarbonates, polyacrylonitriles, ethylene-propylene copolymers, and mixtures of two or more thereof.

30. The laminate of claim 17 wherein said heat-activatable adhesive layer is comprised of a heat-activatable adhesive or thermoplastic film material selected from the group consisting of polyolefins, polyamides, polyester copolymers, ionomers based on sodium or zinc salts of ethylene methacrylic acid, polyacrylonitriles, ethylene-vinyl acetate copolymers, ethylene methacrylic acid, ethylene methyl acrylate, ethylene acrylic acid, ethylene ethyl acrylate, and mixtures of two or more thereof.

31. The laminate of claim 27 wherein said first layer is comprised of a thermoplastic polymeric material selected from the group consisting of polyolefins, polyamides, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, ethylene-vinyl acetate copolymers, and mixtures of two or more thereof.

32. The laminate of claim 17 wherein said adhesion-promoting layer is comprised of a material selected from the group consisting of polyolefins, polyamides, polyesters, polyester copolymers, polyurethanes, polysulfones, polyvinylidene chloride, styrene-maleic anhydride copolymers, styrene-acrylonitrile copolymers, ionomers based on sodium or zinc salts of ethylene methacrylic acid, polymethyl methacrylates, acrylic polymers and copolymers, polycarbonates, polyacrylonitriles, ethylene-vinyl acetate copolymers, and mixtures of two or more thereof.

33. The laminate of claim 17 wherein said abrasion-resistant transparent coating layer is made from UV curable oligomers selected from the group consisting of epoxies, urethanes, polyesters and acrylics.

34. The laminate of claim 18 wherein said another adhesive layer is comprised of a radiation-cured adhesive material or a removable pressure-sensitive adhesive material.

35. The laminate of claim 19 wherein said carrier sheet is comprised of paper, polymer film, or a combination thereof.

36. The laminate of claim 19 wherein said carrier sheet is comprised of a transparent thermoplastic film.

37. The laminate of claim 17 wherein a tie layer of an adhesive resin is positioned between said lower surface of said first layer and said heat-activatable adhesive layer.

38. The laminate of claim 27 wherein a first tie layer of an adhesive resin is positioned between said core layer and said heat-activatable adhesive layer, and a second tie layer of an adhesive resin is positioned between said core layer and said upper thermoplastic core layer.

* * * * *